United States Patent
Zhang et al.

(10) Patent No.: US 9,020,060 B2
(45) Date of Patent: Apr. 28, 2015

(54) VIRTUAL MULTIPLE-INPUT MULTIPLE-OUTPUT COMMUNICATION METHOD AND DEVICE

(71) Applicant: Huawei Technologies Co., Ltd., Shenzhen (CN)

(72) Inventors: Huawei Zhang, Shanghai (CN); Qunfang Lou, Shanghai (CN); Bin Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/107,633

(22) Filed: Dec. 16, 2013

(65) Prior Publication Data

US 2014/0105318 A1  Apr. 17, 2014

Related U.S. Application Data

(63) Continuation of application No. PCT/CN2011/075889, filed on Jun. 17, 2011.

(51) Int. Cl.
*H04B 7/02* (2006.01)
*H04L 1/02* (2006.01)
*H04B 7/04* (2006.01)
*H04W 72/12* (2009.01)
*H04L 5/00* (2006.01)
(Continued)

(52) U.S. Cl.
CPC ........... *H04B 7/0408* (2013.01); *H04W 72/121* (2013.01); *H04L 5/00* (2013.01); *H04W 72/046* (2013.01); *H04L 5/0023* (2013.01); *H04B 7/0452* (2013.01); *H04B 7/10* (2013.01)

(58) Field of Classification Search
USPC ......................................................... 375/267
See application file for complete search history.

(56) References Cited

U.S. PATENT DOCUMENTS

2004/0063468 A1    4/2004  Frank
2005/0243756 A1*  11/2005  Cleveland et al. ............ 370/328
2007/0171808 A1    7/2007  Wu et al.
(Continued)

FOREIGN PATENT DOCUMENTS

CN    101577615 A    11/2009
CN    101667903 A     3/2010
(Continued)

OTHER PUBLICATIONS

International Search Report mailed Mar. 22, 2012 in corresponding International Application No. PCT/CN/075889.
(Continued)

*Primary Examiner* — Erin File
(74) *Attorney, Agent, or Firm* — Staas & Halsey LLP

(57) ABSTRACT

The present invention provides a virtual multiple-input multiple-output communication method and device. The method includes: determining a user set to which a user equipment in a sector belongs, where the user set includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group (101); and selecting, when a scheduled user equipment belongs to the first user set, an unscheduled user equipment in the second user set for pairing.

12 Claims, 4 Drawing Sheets

Determine a set to which a user equipment in a sector belongs, where the set to which the user equipment belongs includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group — 101

Select, when a scheduled user equipment belongs to the first user set, an unscheduled user equipment in the second user set for pairing, where a paired user equipment and the scheduled user equipment use a same time-frequency resource — 102

(51) Int. Cl.
*H04W 72/04* (2009.01)
*H04B 7/10* (2006.01)

(56) References Cited

U.S. PATENT DOCUMENTS

| | | | | |
|---|---|---|---|---|
| 2011/0044272 | A1* | 2/2011 | Cui et al. | 370/329 |
| 2012/0127948 | A1* | 5/2012 | Chung et al. | 370/329 |
| 2013/0182665 | A1* | 7/2013 | Venkatraman et al. | 370/329 |

FOREIGN PATENT DOCUMENTS

| | | |
|---|---|---|
| CN | 101997653 A | 3/2011 |
| CN | 102025463 A | 4/2011 |
| WO | 2011/053807 A1 | 5/2011 |
| WO | 2011/063052 A2 | 5/2011 |

OTHER PUBLICATIONS

R1-051422, "UL Virtual MIMO System Level Performance Evaluation for E-UTRA," *3GPP TSG-RAN1 WG1* #43, Nov. 7-11, 2005, pp. 1-5, Agenda Item 8.1, Nortel, Seoul, Korea.

Bin, Fan, Qian Yu, and Zheng Kan, "Group-based user pairing for virtual MIMO in LTE," *The Journal of China Universities of Posts and Telecommunications*, Sep. 2007, pp. 38-42, vol. 14, Issue 3, Wireless Signal Processing and Network Laboratory, Beijing University of Posts and Telecommunications, Beijing, China.

Bin, Fan, Wang Wen-Bo, and Wang Xiao-Ting, "An MMSE-SIC Receiver Assisted Pairing Scheduling Strategy for VMIMO Systems," *Journal of Beijing University of Posts and Telecommunications*, Oct. 2008, pp. 128-130, vol. 31, No. 5, Laboratory of Universal Wireless Communication, Ministry of Education, Beijing University of Posts and Telecommunications with Beijing Institute of Tracking and Telecommunication Technology, Beijing, China.

Chen, Qing, Wu Chen, Xuming Fang, Rong He, and Bo Huang, "A Pairing Scheduling Scheme for Virtual MIMO Systems," *6th International Conference on Wireless Communications Networking and Mobile Computing (WiCOM)*, Sep. 23-25, 2010, pp. 1-6, Provincial Key Lab of Information Coding & Transmission, Southwest Jiaotong University, Chengdu, China.

International Search Report issued Mar. 22, 2012, in corresponding International Patent Application No. PCT/CN2011/075889.

Extended European Search Report issued Mar. 31, 2014, in corresponding European Patent Application No. 11867716.0.

* cited by examiner

US 9,020,060 B2

VIRTUAL MULTIPLE-INPUT MULTIPLE-OUTPUT COMMUNICATION METHOD AND DEVICE

CROSS-REFERENCE TO RELATED APPLICATIONS

This application is a continuation of International Application No. PCT/CN2011/075889, filed on Jun. 17, 2011, which is hereby incorporated by reference in the entirety.

TECHNICAL FIELD

Embodiments of the present invention relate to the field of wireless communications, and in particular, to a virtual multiple-input multiple-output communication method and device.

BACKGROUND

In a VMIMO (Virtual Multiple-Input Multiple-Output, virtual multiple-input multiple-output) technology, pairing is performed on user equipments (UE, User Equipment), so as to enable two paired user equipments to send data simultaneously on a same time-frequency resource, and share the same time-frequency resource, which implements space division multiplexing of the time-frequency resource, thereby improving capacity of an uplink system.

When VMIMO communication is performed, a problem to be considered primarily of a VMIMO communication method is how to select a proper user equipment to perform VMIMO pairing, so as to maximize overall system capacity. In an existing VMIMO communication method, when user equipment pairing is performed, for a currently scheduled user equipment, remaining unscheduled user equipments need to be searched. Each currently scheduled user equipment needs to perform a pairing attempt with all other unscheduled user equipments, and corresponding pairing measurement values (such as, orthogonality, a capacity gain and a PF priority). Finally, a pairing combination having a greatest measurement value is determined as paired user equipments in the VMIMO communication method.

For example, it is assumed that time-frequency resources in a sector may be scheduled to M user equipments for use. After M user equipments are scheduled, it is assumed that there are N remaining unscheduled user equipments without allocated resources. The N unscheduled user equipments are regarded as candidates for paired user equipments of the M scheduled user equipments, that is, each user equipment in the M scheduled user equipments may attempt to be paired with each user equipment in the N user equipment. Therefore, it can be known that, when there are many user equipments (for example, the number N of unscheduled user equipments is large), a calculation amount of attempts to perform pairing on user equipments is large, and a requirement for implementation complexity of a product is high.

SUMMARY

Embodiments of the present invention provide a virtual multiple-input multiple-output VMIMO communication method and device, which can improve efficiency of user equipment pairing.

In one aspect, a user equipment pairing method is provided and includes: determining a set to which a user equipment in a sector belongs, where the set to which the user equipment belongs includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group; and selecting, when a scheduled user equipment belongs to the first user set, an unscheduled user equipment in the second user set for pairing, where a paired user equipment and the scheduled user equipment use a same time-frequency resource.

In another aspect, a device is provided and includes: a determining unit, configured to determine a set to which a user equipment in a sector belongs, where the set to which the user equipment belongs includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group; and a pairing unit, configured to select, when a scheduled user equipment belongs to the first user set, an unscheduled user equipment in the second user set for pairing, where a paired user equipment and the scheduled user equipment use a same time-frequency resource.

In the embodiments of the present invention, for user equipments in one sector, first set classification is performed on them. During user equipment pairing, an unscheduled user equipment which is not in a same set as a scheduled user equipment is selected for pairing, thereby reducing a calculation amount of pairing, and improving efficiency of user equipment pairing.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

For a problem that a calculation amount is large when user equipment pairing processing is performed in an existing VMIMO communication method, the embodiments of the present invention provide a user equipment set classification solution based on a beam coverage range, which can reduce the calculation amount of pairing processing in the VMIMO communication method.

Figure 1:
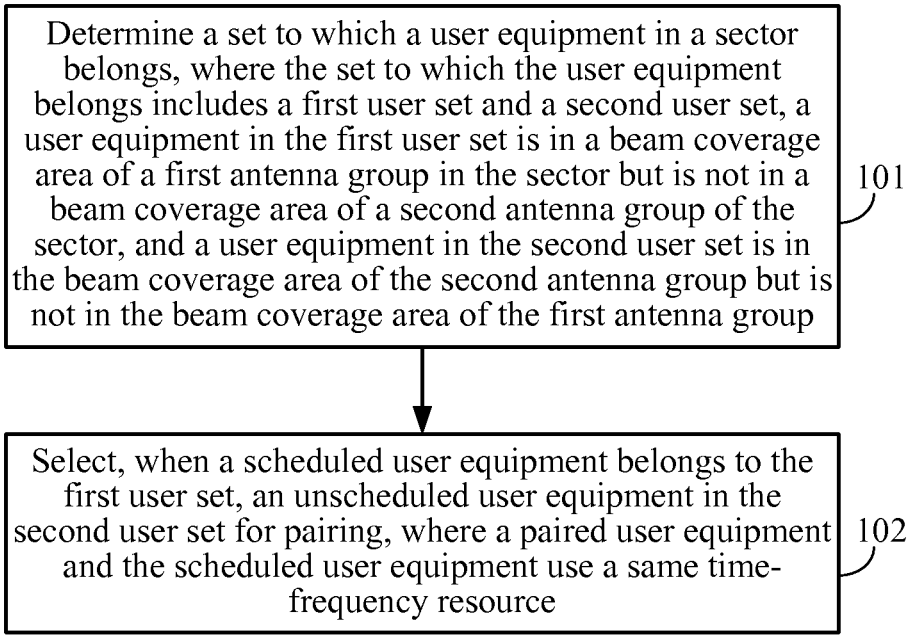
FIG. 1 is a schematic flow chart of a user equipment pairing method according to an embodiment of the present invention.

FIG. 1 is a schematic flow chart of a user equipment pairing method according to an embodiment of the present invention. The method in FIG. 1 is executed by a device (such as, a base station, an eNodeB, or a baseband processing unit in a distributed base station scenario).

101: Determine a set to which a user equipment in a sector belongs, where the set to which the user equipment belongs includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group.

102: Select, when a scheduled user equipment belongs to the first user set, an unscheduled user equipment in the second user set for pairing, where a paired user equipment and the scheduled user equipment use a same time-frequency resource.

In the embodiment of the present invention, for user equipments in one sector, first set classification is performed on them. During user equipment pairing, an unscheduled user equipment which is not in a same set as a scheduled user equipment is selected for pairing, thereby reducing a calculation amount of pairing, and improving efficiency of user equipment pairing.

The "first" and the "second" used in the embodiment in FIG. 1 do not limit the scope of the present invention. For example, the first user set and the second user set may be exchanged. Alternatively, it may also be stated in the foregoing 102 that when a scheduled user equipment belongs to the second user set, an unscheduled user equipment is selected from the first user set for pairing. Such statement still falls within the scope of the embodiment of the present invention.

Figure 2:
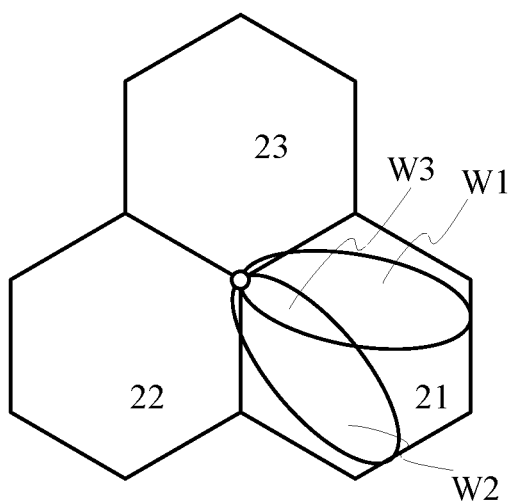
FIG. 2 is a schematic diagram of an example of a beam coverage area according to an embodiment of the present invention.

The sector in the embodiment of the present invention may refer to a sector in a scenario where three sectors form a cell, and may also refer to a sector in a scenario where another number of sectors (such as, six sectors) form a cell. The present invention does not limit a specific dividing manner of the sector, and a cell may include any number of sectors. A scenario where three sectors, such as 21, 22 and 23 in FIG. 2, form a cell is taken as an example. FIG. 2 is a schematic diagram of an example of a beam coverage area according to an embodiment of the present invention. FIG. 2 schematically describes beam coverage areas W1 and W2 in the sector 21. The beam coverage areas W1 and W2 respectively correspond to different antenna groups on a sector of a base station, and an overlapping area of the beam coverage areas W1 and W2 of the two antenna groups is W3.

Referring to the embodiment in FIG. 1, a user equipment in a first user set C1 is in an area (called area W1-W3) in the beam coverage area W1 except the area W3, and a user equipment in a second user set C2 is in an area (called area W2-W3) in the beam coverage area W2 except the area W3. However, it should be noted that, in the embodiment of the present invention, all user equipments in the area W1-W3 do not need to belong to the first user set C1, and all user equipments in the area W2-W3 do not need to belong to the second user set C2. In the embodiment of the present invention, it is only required that the user equipments in the two user sets C1 and C2 are respectively in the two non-overlapping areas W1-W3 and W2-W3. For example, the user equipment in the user set C1 is only in a sub-area of the area W1-W3.

Optionally, in an embodiment, other user equipments in a sector except user equipments in a first user set C1 and a second user set C2 may be classified into a third user set E, that is, user equipments in the third user set E is other user equipments which are in the sector and belong to neither the first user set C1 nor the second user set C2. The following describes an example of determining a set to which a user equipment belongs.

Figure 3:
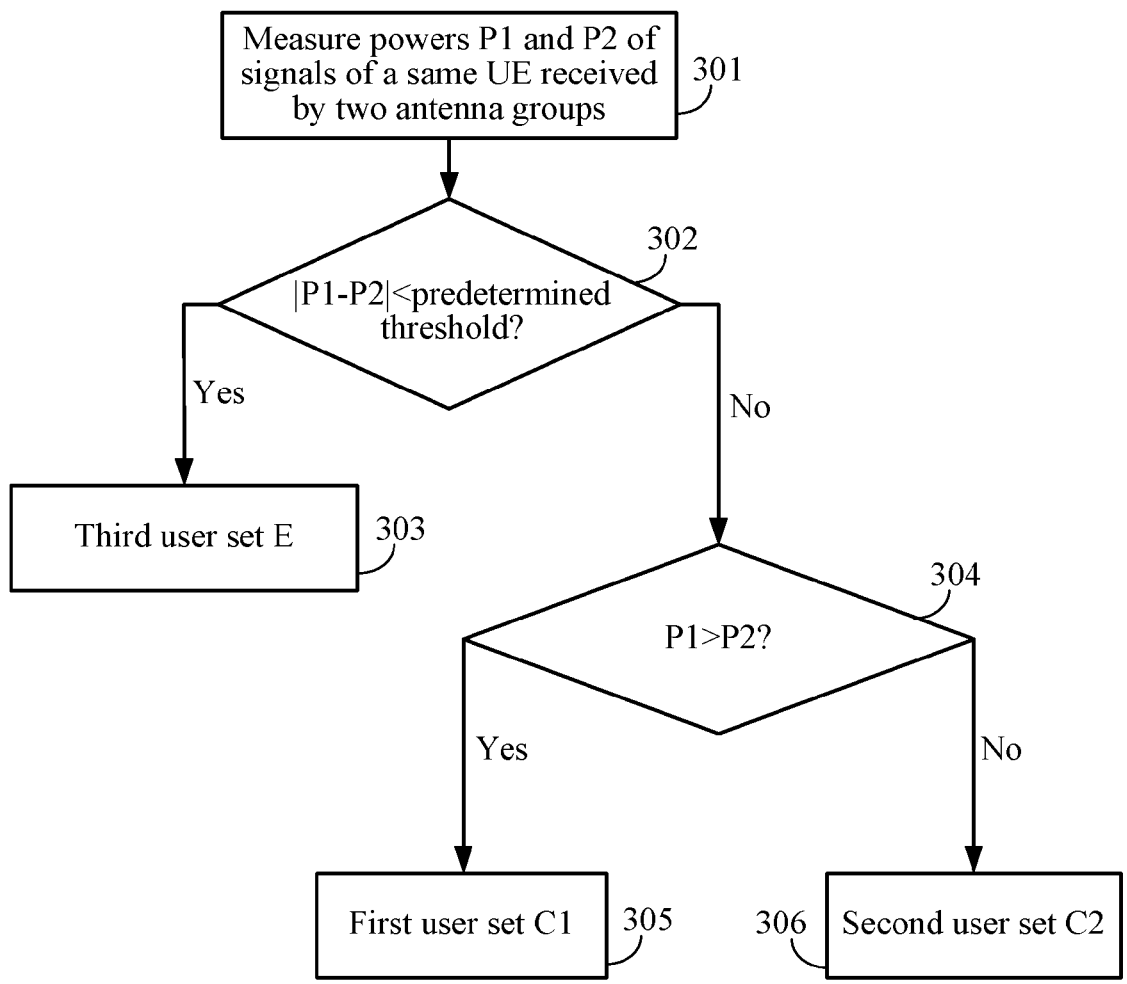
FIG. 3 is a schematic flow chart of an example of a process for determining a set to which a user equipment belongs according to an embodiment of the present invention.

FIG. 3 is a schematic flow chart of an example of a process (101 in FIG. 1) for determining a set to which a user equipment belongs according to an embodiment of the present invention. In the embodiment in FIG. 3, a first power of a signal of a user equipment received by a first antenna group is measured, a second power of a signal of the same user equipment received by a second antenna group is measured, and a set to which the user equipment belongs is determined according to the first power and the second power. It should be noted that, FIG. 3 presents a method for determining, according to a power difference and a predetermined threshold, the set to which the user equipment belongs, but the embodiment of the present invention is not limited thereto, and for example, the set to which the user equipment belongs may be determined according to a power ratio and/or through other parameters. These variations fall within the scope of the embodiment of the present invention.

301: Measure powers of signals of a same user equipment UE received by two antenna groups, where it is assumed that a received power on a first antenna group is a first power P1, and a received power on a second antenna group is a second power P2.

302: Compare an absolute value of a difference |P1−P2| of the two received powers with a predetermined threshold. If the absolute value of the power difference is smaller than the predetermined threshold, it indicates that the received powers of the two antenna groups for the user equipment are close. In this case, it may be determined that the user equipment belongs to neither a first user set C1 nor a second user set C2. Therefore, proceed to 303 to determine that the user equipment belongs to a third user set E. On the other hand, if the absolute value of the power difference is greater than or equal to the predetermined threshold, proceed to 304.

304: Determine which one of P1 and P2 is greater. If P1 is greater, it indicates that the received power on the first antenna group is far greater than the received power on the second antenna group, and proceed to 305 to determine that the user equipment belongs to the first user set C1 corresponding to the first antenna group and is in an area W1-W3 (refer to FIG. 2). On the other hand, if P2 is greater, it indicates that the received power on the second antenna group is far greater than the received power on the first antenna group, and proceed to 306 to determine that the user equipment belongs to the second user set C2 corresponding to the second antenna group and is in an area W2-W3 (refer to FIG. 2).

In this way, user equipments in different user sets correspond to different antenna groups. Therefore, if user equipments in the different user sets are selected for pairing, a same time-frequency resource may be used by paired user equipments when space division multiplexing of the time-frequency resource is implemented.

In the embodiment in FIG. 3, the user equipments each are classified into one of the three user sets, but the embodiment of the present invention is not limited thereto. For example, in a case that the predetermined threshold is 0, processes of 302 to 303 may not be executed, and a magnitude relationship between P1 and P2 may be determined in 304 directly. In other words, in this case, the third user set E is not considered.

Figure 4:
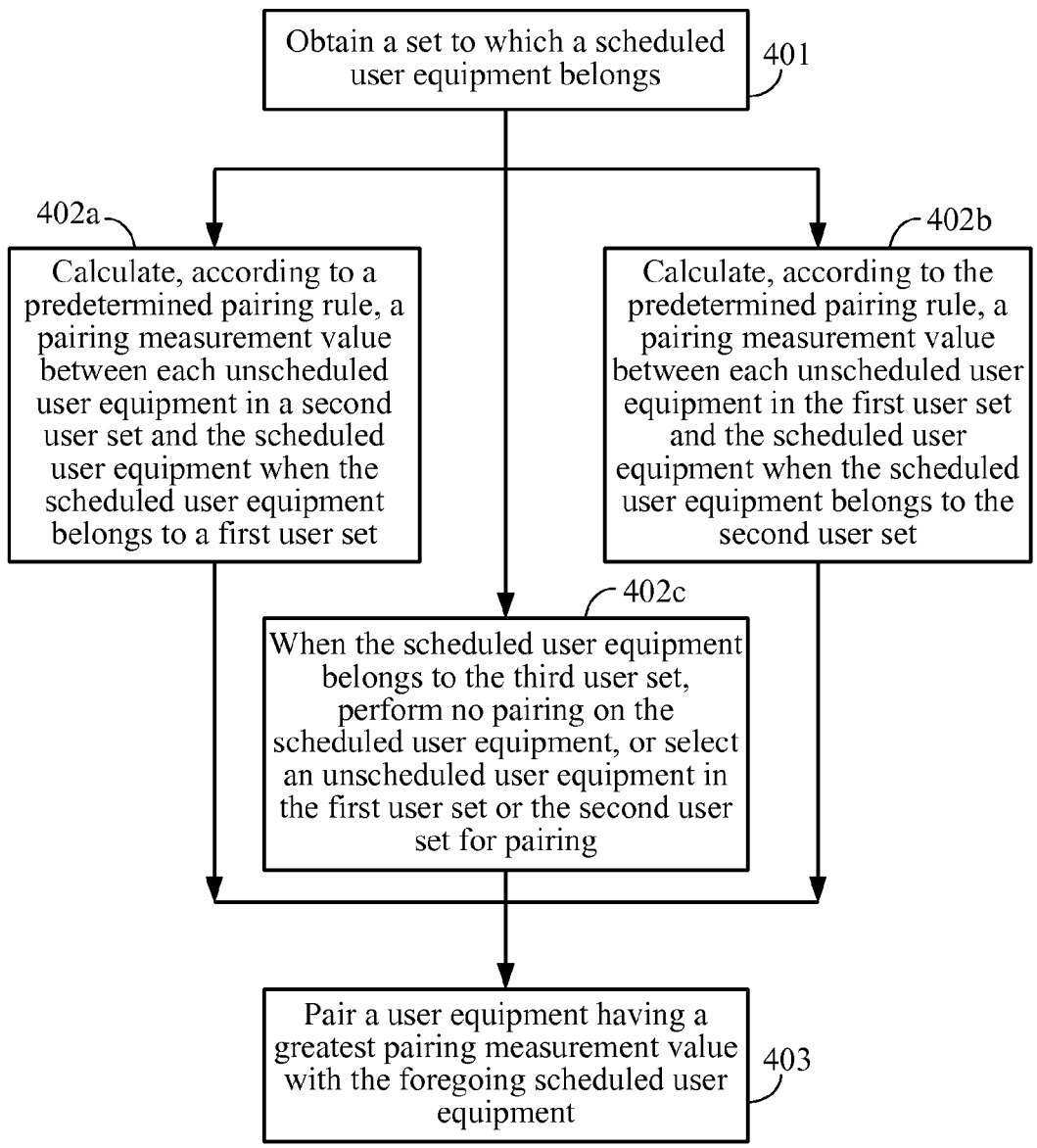
FIG. 4 is a schematic flow chart of an example of a user equipment pairing process according to an embodiment of the present invention.

After the set to which the user equipment belongs is determined, user equipment pairing is performed according to the set to which the user equipment belongs. FIG. 4 is a schematic flow chart of an example of a user equipment pairing process (102 in FIG. 1) according to an embodiment of the present invention.

401: Obtain a set to which a scheduled user equipment belongs. The set to which the user equipment belongs is one of the foregoing first user set C1, second user set C2 and third user set E. In a case that the set to which the user equipment belongs does not include the third user set E, the set to which the user equipment belongs is the foregoing first user set C1 or second user set C2. According to the set to which the scheduled user equipment belongs, in the embodiment in FIG. 4, a paired user equipment is selected according to the following manners of 402a to 402c.

402a: Calculate, according to a predetermined pairing rule, a pairing measurement value between each unscheduled user equipment in the second user set C2 and the scheduled user equipment when the scheduled user equipment belongs to the first user set C1.

402b: Calculate, according to the predetermined pairing rule, a pairing measurement value between each unscheduled user equipment in the first user set C1 and the scheduled user equipment when the scheduled user equipment belongs to the second user set C2.

402c: When the scheduled user equipment belongs to the third user set E, perform no pairing on the scheduled user equipment, or select an unscheduled user equipment in the first user set C1 or the second user set C2 for pairing. 402c is an optional process, and 402c may not be executed when the set to which the user equipment belongs does not include the third user set. Pairing is not performed on the scheduled user equipment when the scheduled user equipment belongs to the third user set, so as to reduce interference incurred by pairing of the user equipment in the set E, and improve performance of a sector edge user.

In 402a to 402c, the foregoing predetermined pairing rule may be an existing VMIMO user equipment pairing rule, and a pairing rule in the prior art may be used, which may include, for example, an orthogonality rule, a capacity rule, and a PF (Proportional Fair, proportional fair) rule.

The orthogonality rule is a most basic pairing algorithm, where a general rule is that a user equipment with high orthogonality preferentially undergoes pairing, and a pairing measurement value obtained according to this rule indicates orthogonality.

The capacity rule calculates a capacity gain or a spectrum efficiency gain of a paired user equipment, and preferentially performs pairing on a user equipment with a greater gain, and a pairing measurement value obtained according to this rule indicates the capacity gain or the spectrum efficiency gain.

The PF rule calculates a PF priority after pairing, and performs pairing on a user equipment with a high priority, and a pairing measurement value obtained according to this rule indicates the PF priority.

403: Pair a user equipment having a greatest pairing measurement value and obtained in 402 with the foregoing scheduled user equipment, that is, a paired user equipment and the scheduled user equipment use a same time-frequency resource.

For example, it is assumed that time-frequency resources in a sector may be scheduled to M user equipments for use. After M user equipments are scheduled, it is assumed that there are N remaining user equipments without allocated resources. Among the N unscheduled user equipments, it is assumed that N1 user equipments belong to the first user set C1, N2 user equipments belong to the second user set C2, and remaining N3 user equipments belong to the third user set E, and it is satisfied that N=N1+N2+N3.

For a certain scheduled user equipment among the M user equipments, when the scheduled user equipment belongs to the first user set C1, a paired user equipment is selected only from the N2 unscheduled user equipments belonging to the second user set C2, rather than selected from all the N unscheduled user equipments, thereby reducing a calculation amount of a pairing algorithm, and improving efficiency of user equipment pairing.

In the embodiment of the present invention, pairing processing in a VMIMO communication method is optimized, so that it is only required to perform pairing searching on a candidate user equipment in one type of unscheduled user equipment set, thereby greatly narrowing a range of pairing searching of user equipments, and lowering searching complexity.

Figure 5:
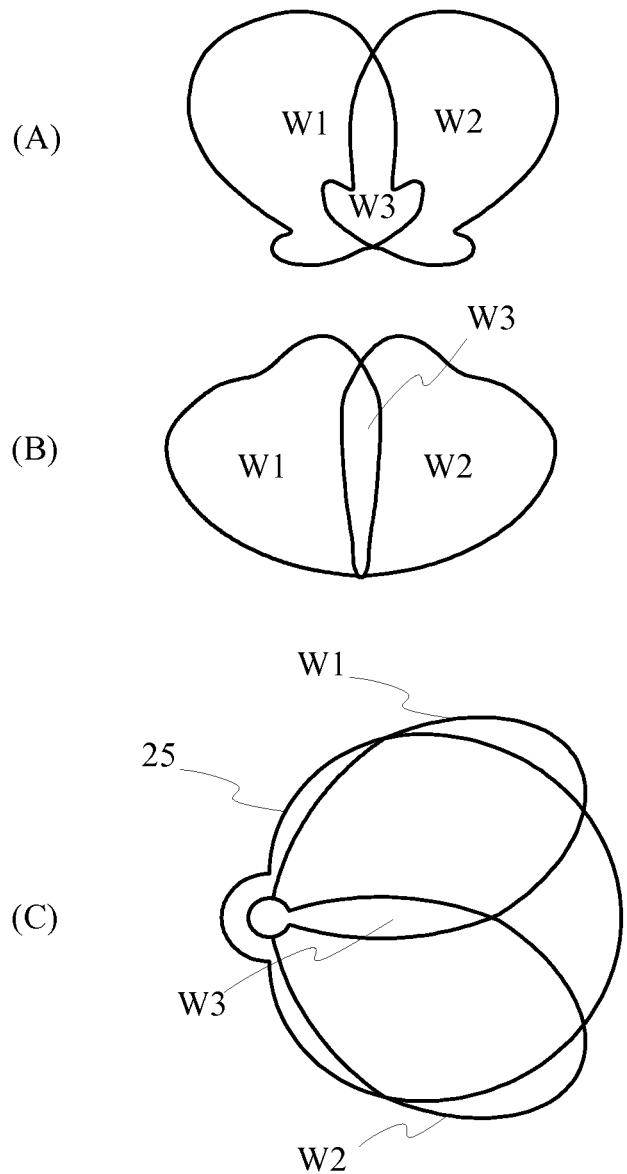
FIG. 5 is a schematic diagram of an example of a beam coverage area according to an embodiment of the present invention.

In the foregoing VMIMO communication method according to the embodiment of the present invention, a beam coverage area may be a beam coverage area respectively formed by antennas which are actually grouped. In this case, beam coverage areas correspond to antenna groups obtained through actual grouping. In addition, the beam coverage area may also be a beam coverage area formed by performing beam weighting on a coverage area of a sector. In this case, each weighted beam coverage area corresponds to some antennas among all antennas in one sector. FIG. 5 is a schematic diagram of an example of a beam coverage area according to an embodiment of the present invention.

Specifically, in the foregoing VMIMO communication method according to the embodiment of the present invention, a first antenna group and a second antenna group may be antennas which are actually grouped in an application, for example, one sector is further divided into two directional antenna groups which have different orientations and are of two beam coverage areas (that is, six-sector configuration), or different antenna groups of a splitting antenna installed inside a same housing. Part (A) of FIG. 5 is an actual narrow beam pattern formed by the two directional antenna groups in one sector under the six-sector configuration. Part (B) of FIG. 5 is an actual narrow beam pattern formed by two antenna groups of the splitting antenna. Two actual narrow beams still belong to a same sector. A user equipment in the sector only needs to be handed over between beams, but does not need to be handed over between sectors.

In the embodiment of the present invention, the first antenna group and the second antenna group may also be two dual-polarized antenna groups of a same sector, where each dual-polarized antenna group includes a pair of dual-polarized antennas. In this case, for a beam coverage area of the antenna group, a three-sector pattern may be approximately formed into a narrow beam pattern based on the three-sector pattern and through a beam weighting technology, for example, a common three-sector 70° antenna pattern may be approximately formed into two 35° antenna patterns. As shown in part (C) in FIG. 5, 25 represents an actual three-sector beam pattern, and W1 and W2 are coverage ranges of two narrow beams which are approximately formed. In this case, there is no need to replace a three-sector antenna with a narrow beam sector antenna, and processing only needs to be performed on software. The two formed narrow beams still belong to the same sector. A user equipment in the sector only needs to be handed over between beams, but does not need to be handed over between sectors.

The foregoing forming manners of actual beam coverage ranges that undergo various kinds of processing may all be applicable to the VMIMO communication method according to the embodiment of the present invention.

Figure 6:
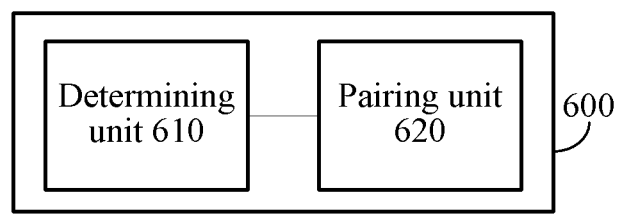
FIG. 6 is a schematic block diagram of a device according to an embodiment of the present invention.

FIG. 6 is a schematic block diagram of a device according to an embodiment of the present invention. An example of a device 600 in FIG. 6 is a base station eNB or a baseband processing unit in a distributed base station scenario. The device 600 includes a determining unit 610 and a pairing unit 620.

The determining unit 610 determines a set to which a user equipment in a sector belongs, where the set to which the user equipment belongs includes a first user set and a second user set, a user equipment in the first user set is in a beam coverage area of a first antenna group in the sector but is not in a beam coverage area of a second antenna group of the sector, and a user equipment in the second user set is in the beam coverage area of the second antenna group but is not in the beam coverage area of the first antenna group.

The pairing unit 620 selects, when a scheduled user equipment belongs to the first user set, an unscheduled user equipment in the second user set for pairing, where a paired user equipment and the scheduled user equipment use a same time-frequency resource.

In the embodiment of the present invention, for user equipments in one sector, first set classification is performed on them. During user equipment pairing, only an unscheduled user equipment which is not in a same set as a scheduled user equipment is selected for pairing, thereby saving a calculation amount of pairing, and improving efficiency of user equipment pairing.

Optionally, in an embodiment, besides the foregoing first user set and second user set, the set to which the user equipment belongs further includes a third user set. A user equipment in the third user set is a user equipment which is in the sector and belongs to neither the first user set nor the second user set. In this case, the pairing unit 620 is further configured to, when a scheduled user equipment belongs to the third user set, perform no pairing on the scheduled user equipment or select an unscheduled user equipment in the first user set or the second user set for pairing.

Optionally, in another embodiment, the determining unit 610 measures a first power of a signal of a user equipment received by a first antenna group, measures a second power of a signal of the user equipment received by a second antenna group, and determines, according to the first power and the second power, a set to which the user equipment belongs. For example, the determining unit 610 may determine, according to the method shown in FIG. 3, based on a difference between the first power and the second power, the set to which the user equipment belongs. Specifically, when an absolute value of the difference between the first power and the second power is smaller than a predetermined threshold, the determining unit 610 determines that the user equipment belongs to the third user set. When the absolute value of the difference between the first power and the second power is greater than or equal to the predetermined threshold and the first power is greater than the second power, the determining unit 610 determines that the user equipment belongs to the first user set. When the absolute value of the difference between the first power and the second power is greater than or equal to the predetermined threshold and the first power is smaller than the second power, the determining unit 610 determines that the user equipment belongs to the second user set.

In addition, the determining unit 610 according to the embodiment of the present invention may also adopt other manners to determine the set to which the user equipment belongs, for example, similar to the method of FIG. 3, determine, based on a ratio of the first power to the second power, the set to which the user equipment belongs.

Optionally, in another embodiment, the pairing unit 620 calculates, according to a predetermined pairing rule, a pairing measurement value between each user equipment in the second user set and a scheduled user equipment when the scheduled user equipment belongs to the first user set, and pairs a user equipment having a greatest pairing measurement value in the second user set with the scheduled user equipment. Because names of the first user set and the second user set may be exchanged, the pairing unit 620 calculates, according to the predetermined pairing rule, a pairing measurement value between each user equipment in the first user set and a scheduled user equipment when the scheduled user equipment belongs to the second user set, and pairs a user equipment having a greatest pairing measurement value in the first user set with the scheduled user equipment. For example, the pairing unit 620 selects a paired user equipment according to the method shown in FIG. 4.

In the embodiment of the present invention, antennas may be grouped according to different manners. For example, a first antenna group and a second antenna group respectively correspond to two directional antenna groups which have different orientations and are of a same sector (FIG. 5 (A)), or a first antenna group and a second antenna group respectively correspond to two antenna groups of a splitting antenna of a same sector (FIG. 5 (B)), or a first antenna group and a second antenna group are respectively two dual-polarized antenna groups of a same sector, and each dual-polarized antenna group includes a pair of dual-polarized antennas (FIG. 5 (C)).

In the embodiment of the present invention, pairing processing in a VMIMO communication method is optimized, so that it is only required to perform pairing searching on a candidate user equipment in one type of unscheduled user equipment set, thereby greatly narrowing a range of pairing searching of user equipments, and lowering searching complexity.

A person of ordinary skill in the art may be aware that, units and algorithm steps of the examples described with reference to the embodiments disclosed herein can be implemented by electronic hardware, or a combination of computer software and electronic hardware. To clearly describe interchangeability between hardware and software, the foregoing has generally described compositions and steps of each example according to functions. Whether these functions are performed in a hardware or software manner depends on specific applications and design constraint conditions of the technical solutions. A person skilled in the art may use different methods to implement the described functions for each specific application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and details are not repeatedly described herein.

In the several embodiments provided in the present application, it should be understood that the disclosed system, apparatus, and method may be implemented in other manners. For example, the described apparatus embodiment is merely exemplary. For example, dividing of the units is merely a kind of logical function dividing, and there may be other dividing manners during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts shown as units may or may not be physical units, may be located in one position, or may also be distributed on a plurality of network units. A part or all of the units may be selected according to actual needs to achieve the objectives of the solutions of the embodiments.

In addition, functional units in the embodiments of the present invention may be integrated into one processing unit, or each of the units may also exist alone physically, or two or more units may also be integrated into one unit. The integrated unit may be implemented in a form of hardware, and may also be implemented in a form of a software functional unit.

When the integrated unit is implemented in a form of a software functional unit and sold or used as an independent product, the integrated unit may be stored in a computer-readable storage medium. Based on such understanding, the technical solutions of the present invention essentially, or the part contributing to the prior art, or a part of the technical solutions may be embodied in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A virtual multiple-input multiple-output (VMIMO) communication method, comprising:
   determining, by a device capable of communication with user equipments in sectors forming a communication cell for the device, a set to which a user equipment in one sector belongs, wherein the set to which the user equipment belongs comprises a first user set and a second user set, a user equipment in the first user set is in a beam coverage area of a first antenna group for the device of the one sector but the first user set user equipment is not in a beam coverage area of a second antenna group for the device of the one sector, and a user equipment in the second user set is in the beam coverage area of the second antenna group for the device but the second user set user equipment is not in the beam coverage area of the first antenna group for the device; and
   selecting, when a scheduled user equipment belongs to the first user set in the one sector, an unscheduled user equipment in the second user set in the one sector, which unscheduled user equipment is not in the beam coverage area of the first antenna group for the device of the one sector, for pairing with the scheduled user equipment, wherein a paired user equipment and the scheduled user equipment use a same time-frequency resource.

2. The method according to claim 1, wherein the set to which the user equipment belongs further comprises a third user set, a user equipment in the third user set is a user equipment which is in the one sector and belongs to neither the first user set nor the second user set, and the method further comprises:
   when a scheduled user equipment belongs to the third user set, performing no pairing on the scheduled user equipment, or selecting an unscheduled user equipment in the first user set or the second user set for pairing.

3. The method according to claim 1, wherein the determining a set to which a user equipment in the one sector belongs comprises:
   measuring a first power of a signal of a user equipment received by the first antenna group, and measuring a second power of a signal of the user equipment received by the second antenna group; and
   determining, according to the first power and the second power, of the user equipment, the set to which the user equipment in the one sector belongs.

4. The method according to claim 3, wherein the determining, according to the first power and the second power, the set to which the user equipment belongs comprises:
   when an absolute value of a difference between the first power and the second power is smaller than a predetermined threshold, determining that the user equipment belongs to the third user set;
   when the absolute value of the difference between the first power and the second power is greater than or equal to the predetermined threshold and the first power is greater than the second power, determining that the user equipment belongs to the first user set; and
   when the absolute value of the difference between the first power and the second power is greater than or equal to the predetermined threshold and the first power is smaller than the second power, determining that the user equipment belongs to the second user set.

5. The method according to claim 1, wherein the selecting, when a scheduled user equipment belongs to the first user set, an unscheduled user equipment in the second user set for pairing comprises:
   calculating, according to a predetermined pairing rule, a pairing measurement value between each unscheduled user equipment in the second user set and the scheduled user equipment when the scheduled user equipment belongs to the first user set; and
   pairing a user equipment having a greatest pairing measurement value in the second user set with the scheduled user equipment.

6. The method according to any one of claim 1, wherein:
   the first antenna group and the second antenna group respectively correspond to two directional antenna groups which have different orientations and are for the one sector; or the first antenna group and the second antenna group respectively correspond to two antenna groups of a splitting antenna for the one sector; or the first antenna group and the second antenna group are respectively two dual-polarized antenna groups for the one sector, and a dual-polarized antenna group comprises a pair of dual-polarized antennas.

7. A device capable of communication with user equipments in sectors forming a communication cell for the device, the device comprising:

a determining unit, configured to determine a set to which a user equipment in one sector belongs, wherein the set to which the user equipment belongs comprises a first user set and a second user set, a user equipment in the first user set is in a beam coverage area of a first antenna group for the device of the one sector but the first user set user equipment is not in a beam coverage area of a second antenna group for the device of the one sector, and a user equipment in the second user set is in the beam coverage area of the second antenna group for the device but the second user set user equipment is not in the beam coverage area of the first antenna group for the device; and a pairing unit, configured to select, when a scheduled user equipment belongs to the first user set in the one sector, an unscheduled user equipment in the second user set in the one sector, which unscheduled user equipment is not in the beam coverage area of the first antenna group for the device of the one sector, for pairing with the scheduled user equipment, wherein a paired user equipment and the scheduled user equipment use a same time-frequency resource.

8. The device according to claim 7, wherein the set to which the user equipment belongs further comprises a third user set, a user equipment in the third user set is a user equipment which is in the one sector and belongs to neither the first user set nor the second user set, and the pairing unit is further configured to, when a scheduled user equipment belongs to the third user set, perform no pairing on the scheduled user equipment, or select a user equipment in the first user set or the second user set for pairing.

9. The device according to claim 7, wherein the determining unit is further configured to measure a first power of a signal of a user equipment received by the first antenna group, measure a second power of a signal of the user equipment received by the second antenna group, and determine, according to the first power and the second power, of the user equipment, the set to which the user equipment in the one sector belongs.

10. The device according to claim 9, wherein the determining unit is configured to:

when an absolute value of a difference between the first power and the second power is smaller than a predetermined threshold, the determining unit determines that the user equipment belongs to the third user set;

when the absolute value of the difference between the first power and the second power is greater than or equal to the predetermined threshold and the first power is greater than the second power, the determining unit determines that the user equipment belongs to the first user set; and when the absolute value of the difference between the first power and the second power is greater than or equal to the predetermined threshold and the first power is smaller than the second power, the determining unit determines that the user equipment belongs to the second user set.

11. The device according to claim 7, wherein the pairing unit calculates, according to a predetermined pairing rule, a pairing measurement value between each unscheduled user equipment in the second user set and the scheduled user equipment when the scheduled user equipment belongs to the first user set, and pairs a user equipment having a greatest pairing measurement value in the second user set with the scheduled user equipment.

12. The device according to claim 7, wherein:

the first antenna group and the second antenna group respectively correspond to two directional antenna groups which have different orientations and are for the one sector; or the first antenna group and the second antenna group respectively correspond to two antenna groups of a splitting antenna for the one sector; or the first antenna group and the second antenna group are respectively two dual-polarized antenna groups for the one sector, and a dual-polarized antenna group comprises a pair of dual-polarized antennas.

\* \* \* \* \*